(12) United States Patent
Beshiri et al.

(10) Patent No.: US 10,549,614 B2
(45) Date of Patent: Feb. 4, 2020

(54) SLIDING TARP SYSTEM

(71) Applicant: GLIDER SYSTEMS IP INC., Tilbury, Ontario (CA)

(72) Inventors: Ilir Beshiri, Windsor (CA); Jacob Klassen, Leamington (CA); Johan Neufeld, Kingsville (CA)

(73) Assignee: GLIDER SYSTEMS IP INC., Tilbury (CA)

( * ) Notice: Subject to any disclaimer, the term of this patent is extended or adjusted under 35 U.S.C. 154(b) by 48 days.

(21) Appl. No.: 15/927,886

(22) Filed: Mar. 21, 2018

(65) Prior Publication Data

US 2018/0272847 A1    Sep. 27, 2018

(30) Foreign Application Priority Data

Mar. 22, 2017  (CA) ...................... 2961621

(51) Int. Cl.
  *B60J 7/06* (2006.01)
  *B62D 63/08* (2006.01)
  *B62D 33/04* (2006.01)
(52) U.S. Cl.
  CPC .............. *B60J 7/062* (2013.01); *B60J 7/065* (2013.01); *B62D 33/04* (2013.01); *B62D 63/08* (2013.01)

(58) Field of Classification Search
  CPC ..... B60J 7/065; B60J 7/06; B60J 7/062; B60J 7/064; B60P 7/04; B60P 7/02; B62D 63/08; B62D 33/04
  See application file for complete search history.

(56) References Cited

U.S. PATENT DOCUMENTS 9,579,959 B2    2/2017  Beshiri et al.

FOREIGN PATENT DOCUMENTS

CA           2899048 A1     1/2017

*Primary Examiner* — D Glenn Dayoan
*Assistant Examiner* — Melissa Ann Bonifazi
(74) *Attorney, Agent, or Firm* — Greer, Burns & Crain, Ltd.

(57) ABSTRACT

Sliding tarp systems employed on trailers are disclosed. Various systems and improvements are disclosed which allow for unobstructed access to the tarp storage area and more reliable operation of the sliding tarp system. Unobstructed access to the storage area is achieved by providing extensions to the sliding tarp system tracks which the sliding tarp system support elements can be slid onto, leaving the storage area completely uncovered. The sliding tarp system track extensions can be removed or reoriented when not in use.

5 Claims, 23 Drawing Sheets

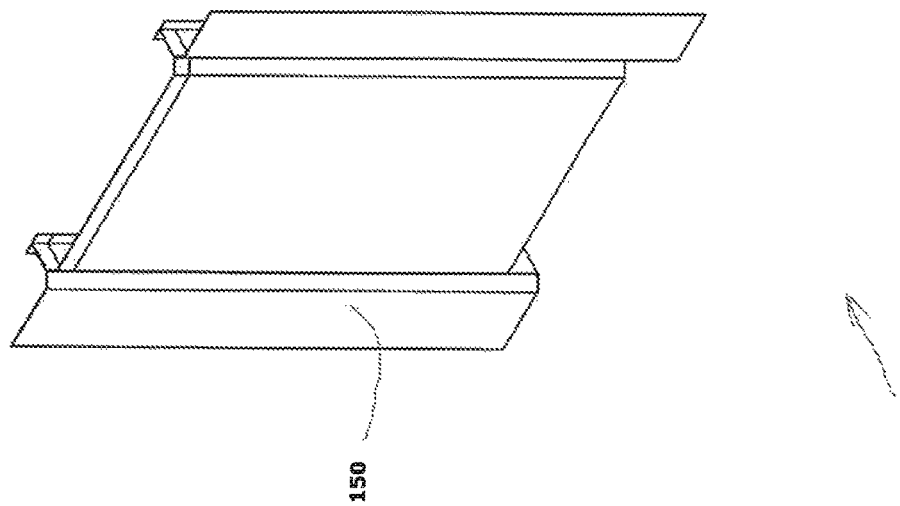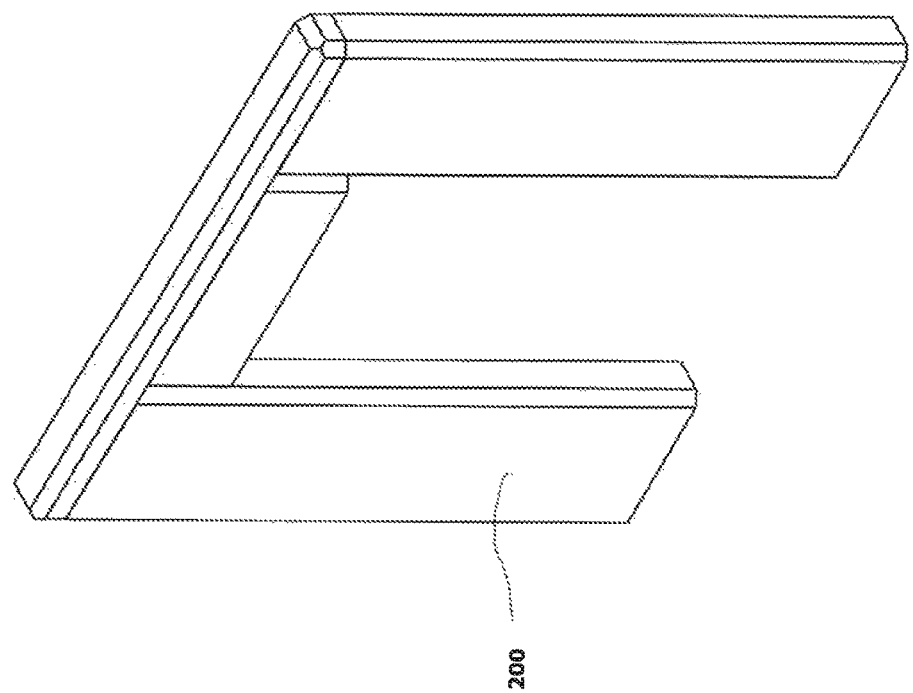
FIG 4

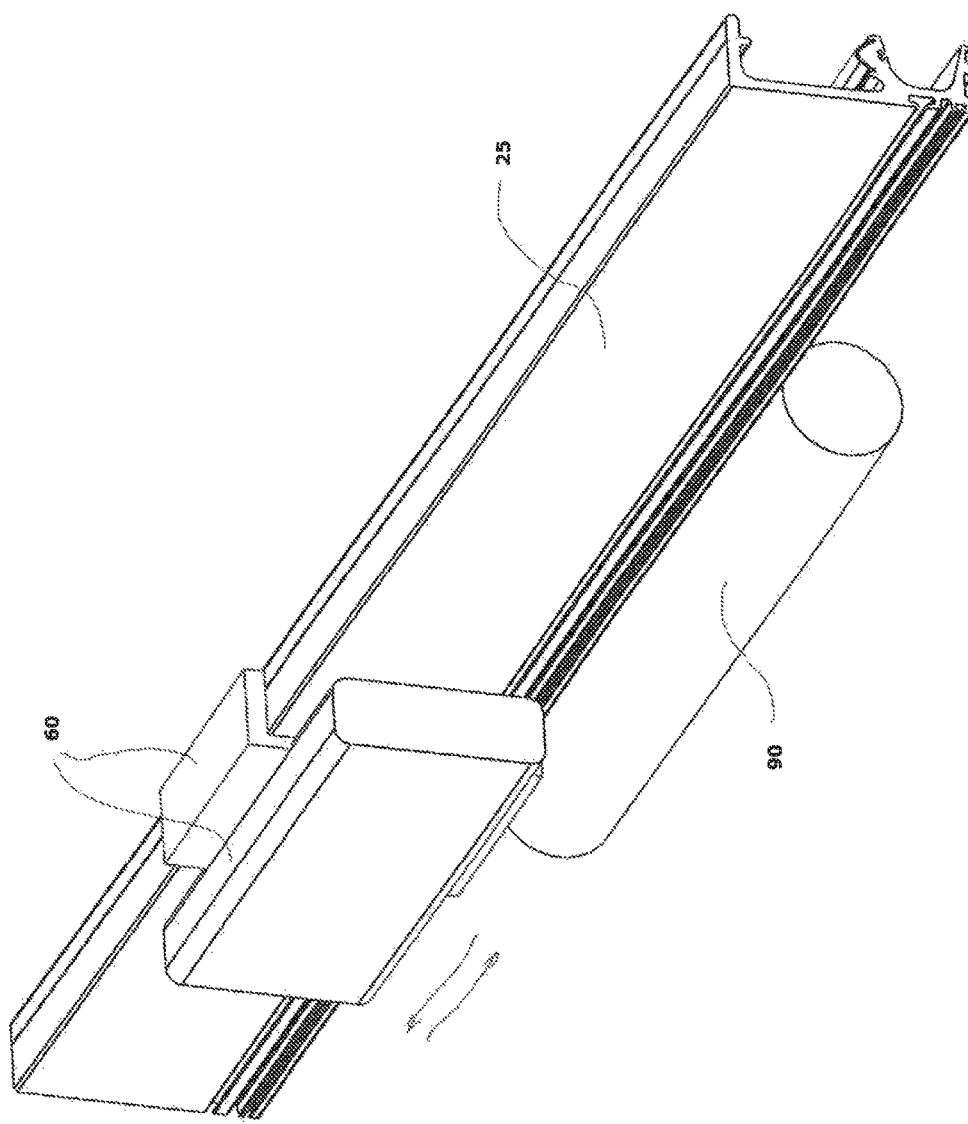

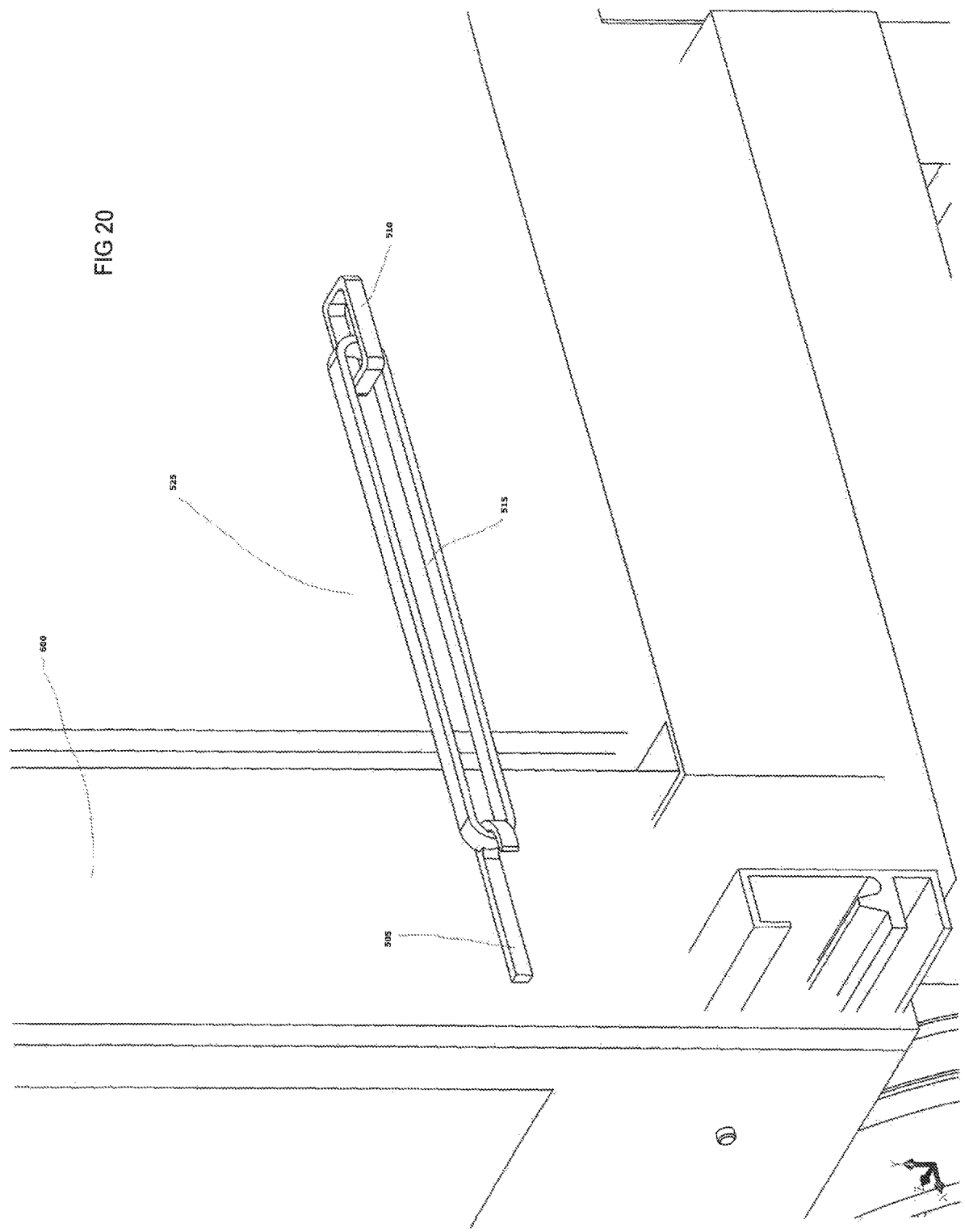

SLIDING TARP SYSTEM

BACKGROUND

The present invention relates generally to sliding tarp systems. Specifically, the present invention relates to improvements to various aspects of sliding tarp systems which can be used to cover the flatbed of trailers or similar storage areas.

Many sliding tarp systems known in the art are attached to tracks that run along the lengths of a trailer and can be retracted along those tracks to provide easier access for loading and unloading. Sliding tarp systems, such as the ones provided by Glider Systems Inc., are retractable to a section at the front or rear of the trailer. Therefore, known systems are not capable of providing full unobstructed access to the trailer. The structures of existing systems are such that when they are fully retracted they still typically obstruct 8 to 10 feet of the trailer length with the tarp frame components. The amount of the obstruction may vary depending on the specific tarp system and trailer dimensions.

Some systems known in the art employ folding arms at the rear of the trailer to permit the tarp system to be rolled partially out of the way of the flatbed section. Such designs are described in U.S. Pat. No. 9,579,959 and CA2899048 to Beshiri et al. However, no designs currently known in the art allow the tarp system to be rolled completely off the flatbed at the front of the trailer due to the bulkhead preventing movement past the end of the trailer towards the front.

It is also an issue with tarp systems known in the art that they cannot accommodate loads which are wider than the width of the flatbed of the trailer. U.S. Pat. No. 9,579,959 and CA 2899048 describe systems which allow modest expansion of the covered width by employing a hinge connection along the edges of a trailer but this system offers inconsistent expansion when in operation.

Another challenge facing tarp systems known in the art is the operation of a rear tensioner for the system. Current designs require the operator to release the tension from the back of the trailer and can be obstructed when the trailer is backed up to a dock for loading and unloading.

Another issue with current tarp systems is accommodating double transition sliding systems for drop deck trailers. A drop deck trailer involves a lower deck portion and an upper deck portion. In double transition systems, the lower rolling tarp frame components are required to roll fully or partially along the upper deck to provide full or partial access to the lower deck. Systems known in the art often have issues with aligning the upper wheels of the frame carriers with the upper deck track. Environmental conditions, such as wind or uneven surfaces, can often cause the wheels on the carriers to miss the upper track.

Tarp covering systems are also often built with lightweight components to improve operation. However, the use of lightweight components, such as aluminum, often results in problems with premature fatigue of the moving components and cracks developing in the frames.

Tarp covering systems also frequently have problems with the strength of the rear flap closure due to insufficient means of securing the flap in place.

SUMMARY

According to one aspect of the present invention, a sliding tarp system is provided which allows the frames to be fully retracted past the front end of the trailer, allowing full unobstructed access to the entire flatbed of a trailer.

According to another aspect of the present invention, a mechanism for widening the tarp coverage beyond the width of the trailer is provided. By expanding the tarp coverage area, the trailer may be capable of accommodating loads which are wider than would typically be possible.

According to yet another aspect of the present invention, a mechanism is provided which allows the operator to release the tension on the tarp from the front of the trailer. A means of releasing the tension remotely is also provided.

According to yet another aspect of the present invention, a frame carrier is provided which may reduce the risk of the frame carrier missing the upper track when retracting the tarp to the upper deck.

According to yet another aspect of the present invention, a reinforcing element is provided for the tarp frame carrier assembly to reduce fatigue on the moving components and frame cracking.

According to yet another aspect of the present invention, a flap securing assembly is provided which improves the reliability of the flap closure.

BRIEF DESCRIPTION OF THE DRAWINGS

The advantages and features of the present invention will become better understood with reference to the following more detailed description and claims taken in conjunction with the accompanying drawings, in which like elements are identified with like symbols.

FIG. 4 is a close-up view of the headboard structure and the fixed front wall of the sliding tarp system of FIGS. 1 to 3.

FIG. 11 is a close-up view of another embodiment of the rear tensioner assemblies.

FIG. 20 is an extreme close-up of the elements of the flap securing system of FIGS. 18 and 19.

DETAILED DESCRIPTION

Figure 1:
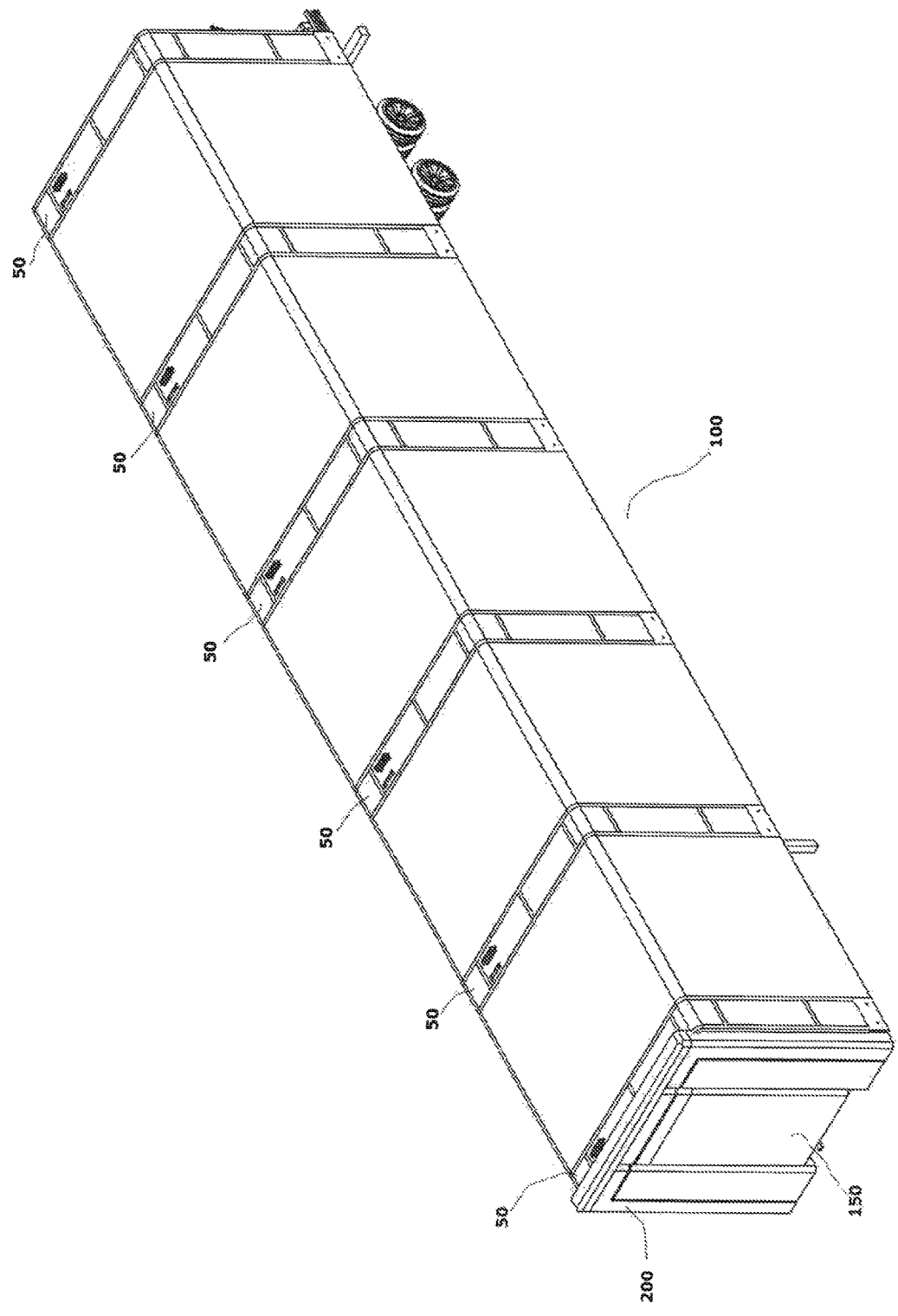
FIG. 1 is a perspective view of one embodiment of a sliding tarp system with the tarp fully extended across the length of the trailer.

The following describes various preferred embodiments of a sliding tarp system. Each of the embodiments described herein is described in relation to a trailer. However, it will be understood by those skilled in the art that the systems disclosed could be adapted to operate in conjunction with any large storage area for which it would be useful to have a sliding tarp system to provide retractable protection from environmental elements without departing from the scope of the present invention.

Each of the embodiments described herein comprises at least two tracks 25 (see FIGS. 5, 9, 10, 11, 14) which run along the lengths of the storage area. These tracks 25 engage carriers 350 or 351 (see FIGS. 12, 13, 16, 17). Carriers 350 are dispersed in each track 25 in pairs (one carrier in each track positioned parallel to each other). Each pair of carriers 350, 351 attaches to a respective side of a frame 50 (see FIGS. 1, 2, 3, 5, 9). Each sliding tarp system includes a plurality of frames 50 and corresponding carrier 350 pairs which provide support for one or more tarps. As a corresponding pair of carriers 350 is moved along the tracks 25, the respective attached frame 50 is moved as well. Moving the frames 50 along the tracks 25 allows the one or more tarps to be extended or retracted along the length of the storage area.

Figure 2:
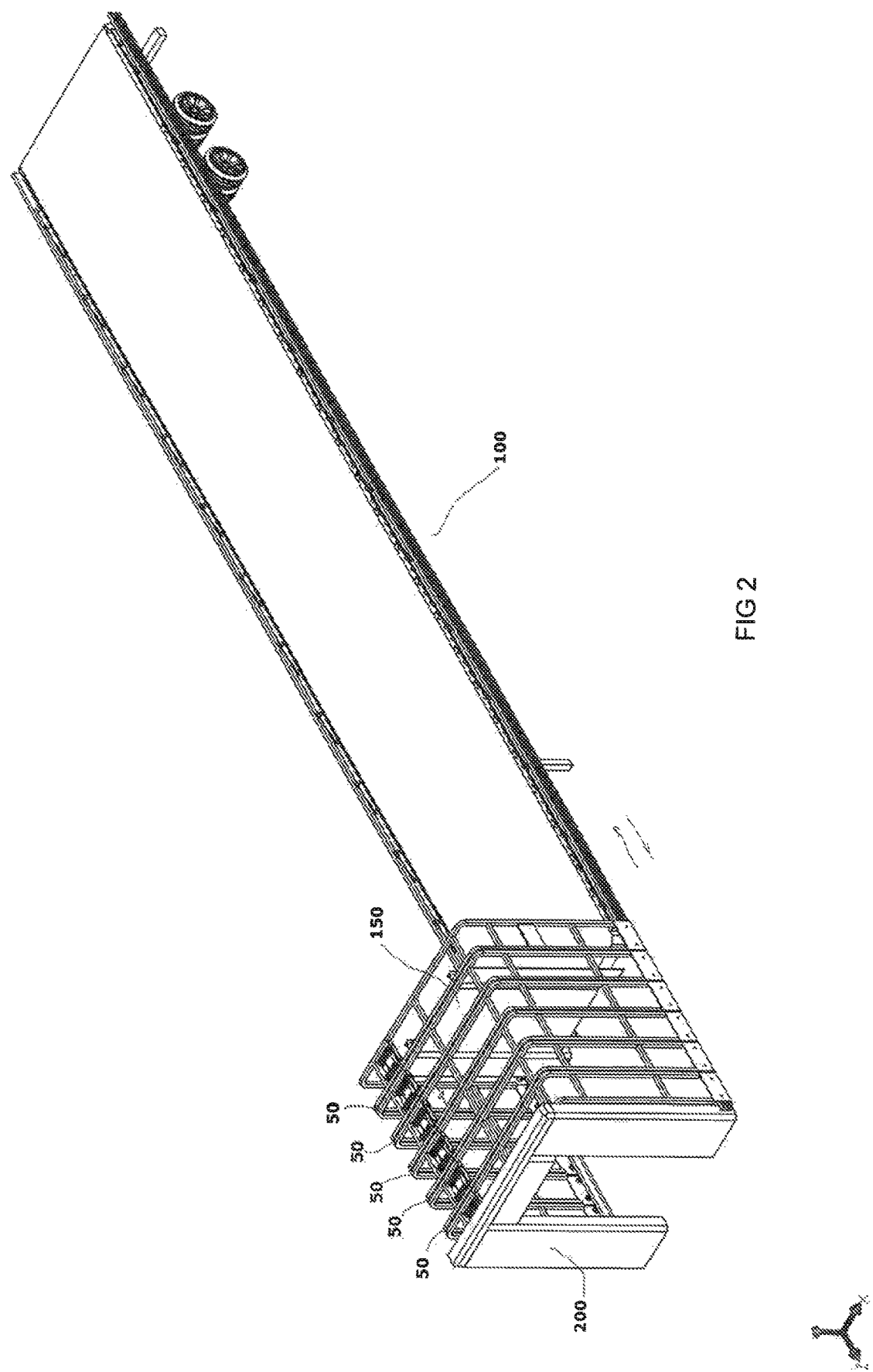
FIG. 2 is a perspective view of the sliding tarp system of FIG. 1 with the tarp removed and the frame fully retracted past the front end of the trailer.
Figure 3:
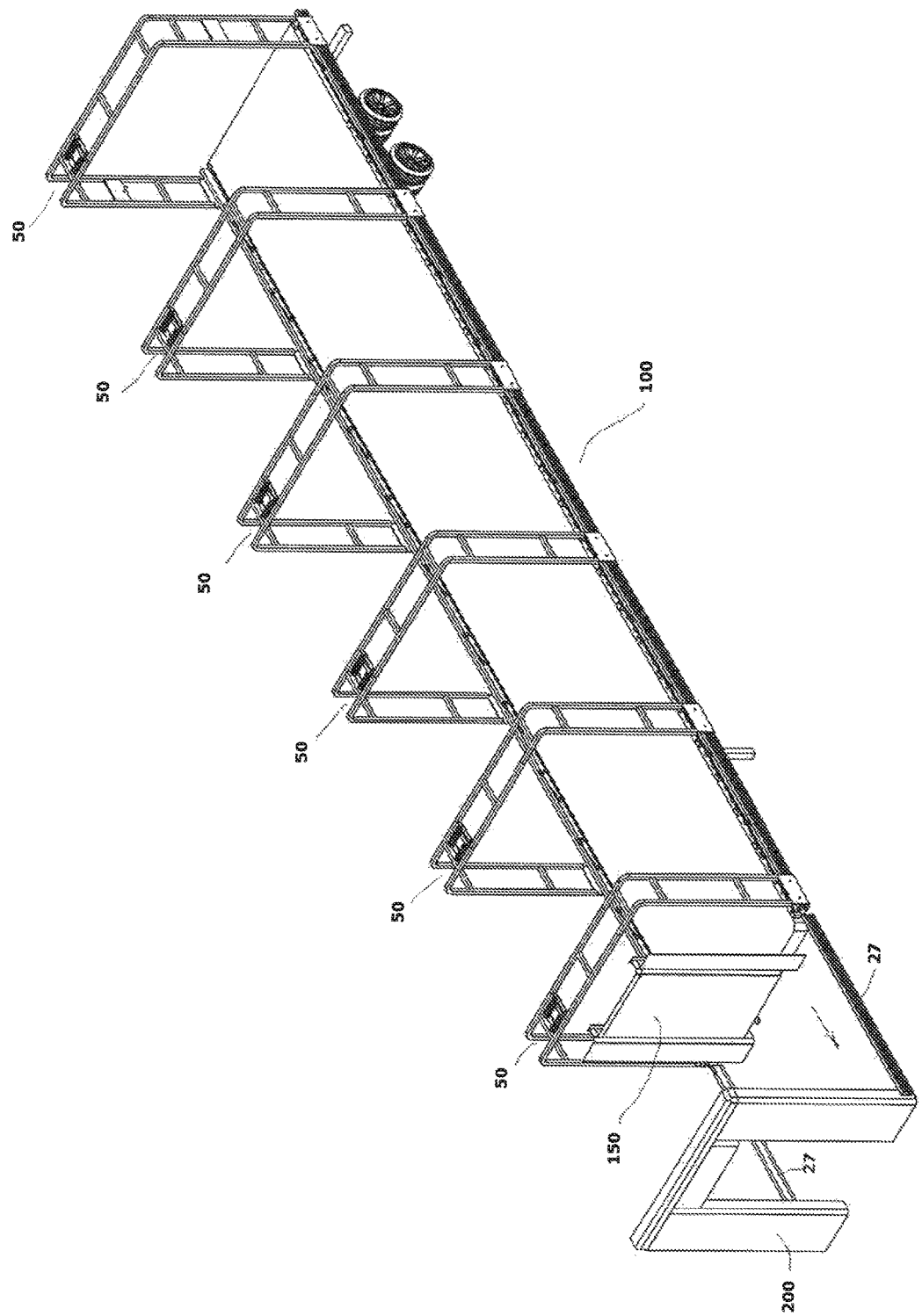
FIG. 3 is a perspective view of the sliding rail tarp system of FIGS. 1 and 2 with the tarp removed, the extension rails extended, and the rest of the frame extended across the length of the trailer.

FIGS. 1 to 3 depict an embodiment of a sliding tarp system attached to a trailer 100 including rail extensions 27 (see FIG. 3). The rail extensions 27 connect to the end of the sliding tarp system tracks and enable the sliding tarp system to retract completely for unobstructed access to the trailer 100. The sliding tarp system also includes a U-shaped headboard 200 and a fixed front wall 150 at a front end of the trailer 100. When the rail extensions 27 are engaged with the tracks, the U-shaped headboard 200 and the plurality of frames 50 can be slid over the fixed front wall 150, past the front end of the trailer 100 onto frame extensions 27. When the U-shaped headboard 200 and the plurality of frames 50 are retracted onto the frame extensions 27, the entire trailer 100 storage area can be accessed without obstruction from the sliding tarp system.

FIG. 1 depicts the sliding tarp system fully extended over the trailer 100 storage area. FIG. 2 depicts the U-shaped headboard 200 and the plurality of frames 50 fully retracted with the tarp removed. FIG. 3 depicts only the U-shaped headboard 200 retracted onto the frame extensions 27 and the plurality of frames 50 fully extended along the length of the trailer with the tarp removed. FIG. 4 depicts a close-up of only the U-shaped headboard 200 and the fixed front wall 150.

When not in use, the frame extensions 27 can be rotated into a vertical orientation toward the top of the trailer in one embodiment. In another embodiment, the frame extensions 27 can be removed from the trailer completely when not in use. Embodiments may also allow the frame extensions 27 to be either rotated or removed, depending on the user's preference.

Figure 5:
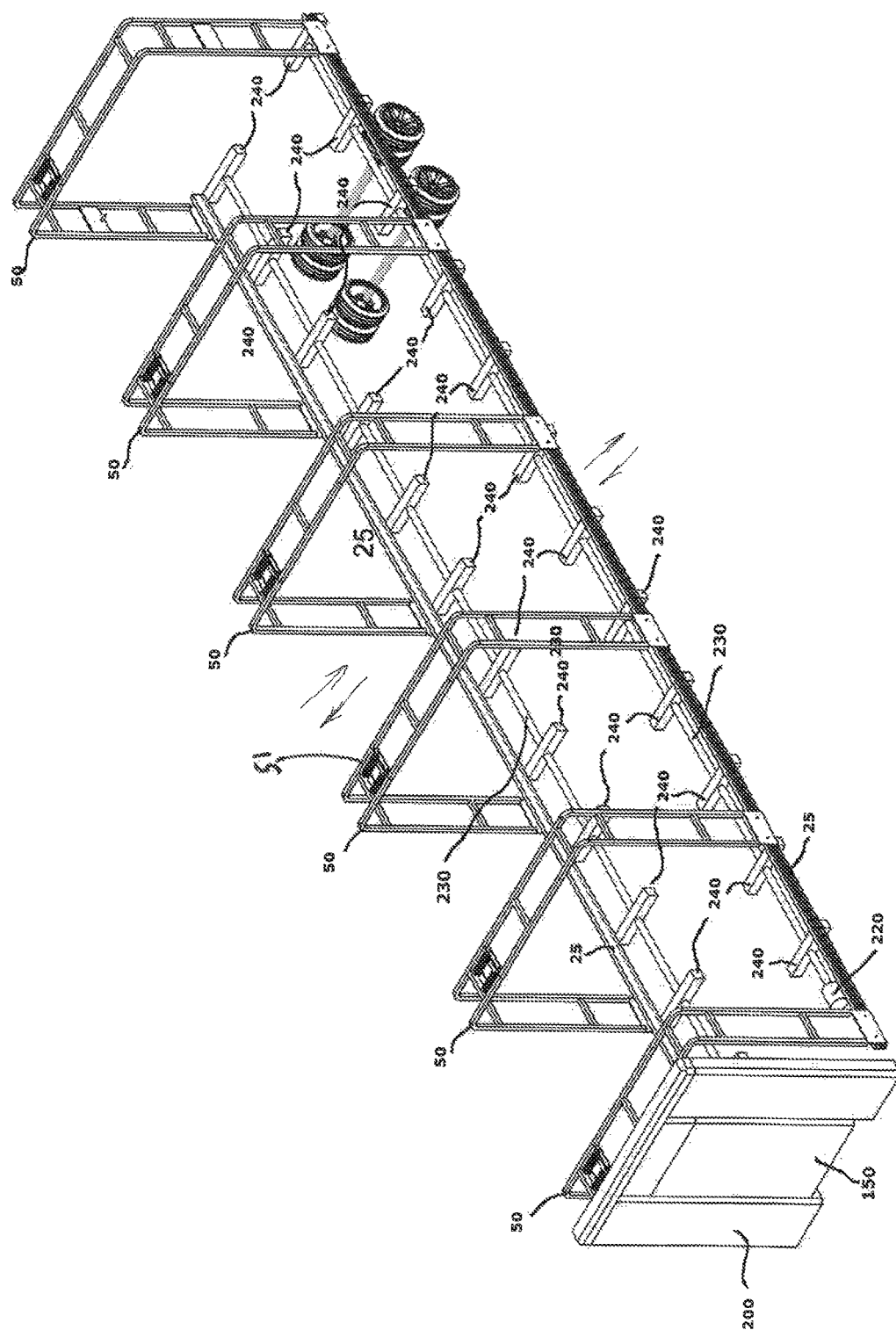
FIG. 5 is a perspective view of another embodiment of a sliding tarp system with extenders to provide tarp coverage widening.
Figure 6:
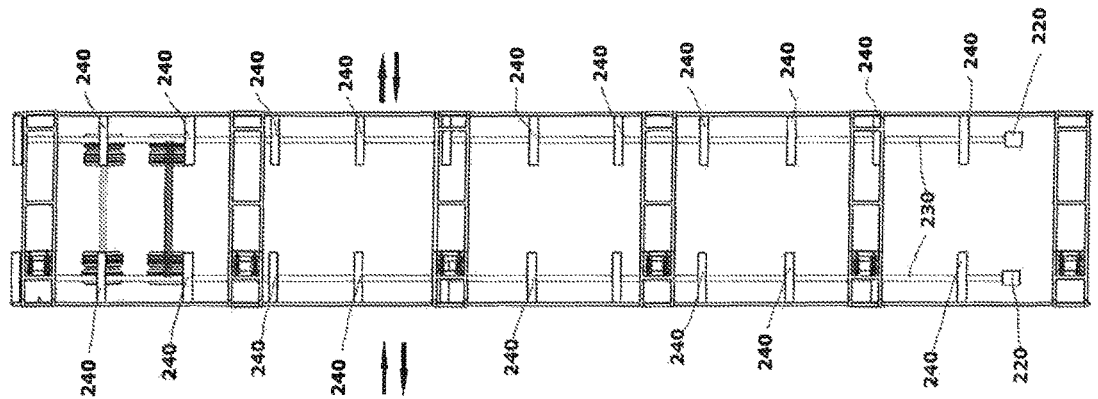
FIG. 6 is an overhead view of the sliding tarp system of FIG. 5.

FIGS. 5 and 6 depict another embodiment of a sliding tarp system including a tarp widening assembly. The tarp widening assembly comprises at least two tarp extenders. Each extender is positioned to run lengthwise along the edge of the trailer next to each track. Each extender comprises an electric motor 220, a shaft 230, and a plurality of sliders 240. The plurality of sliders 240 are dispersed evenly along the length of the shaft 230. Each of the sliders 240 connects to a respective track 25 along the lengthwise edges of the trailer. For each extender, the electric motor 220 is situated at one end of the shaft 230.

Figure 7:
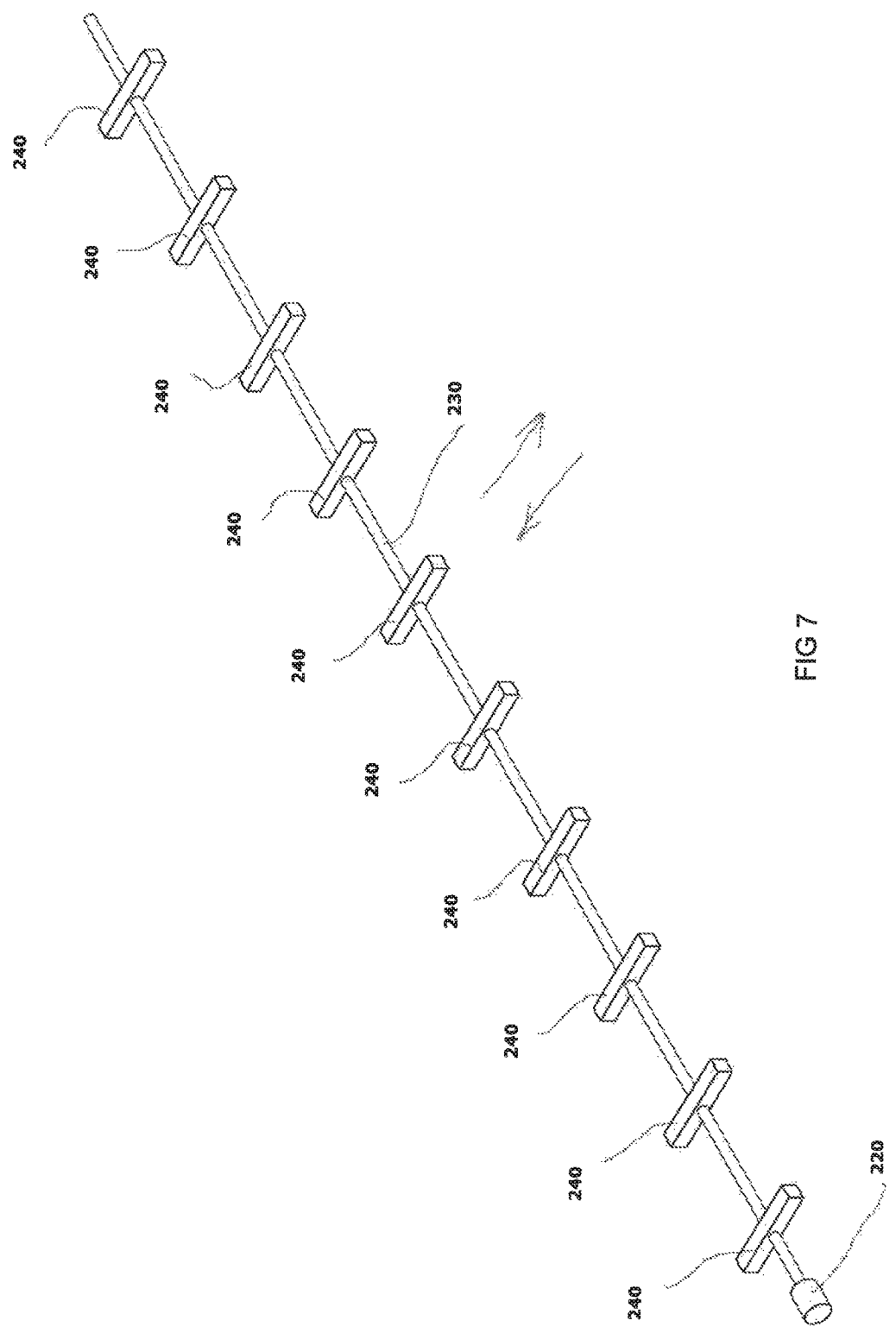
FIG. 7 is a close-up view of one of the extenders of FIGS. 5 and 6.
Figure 8:
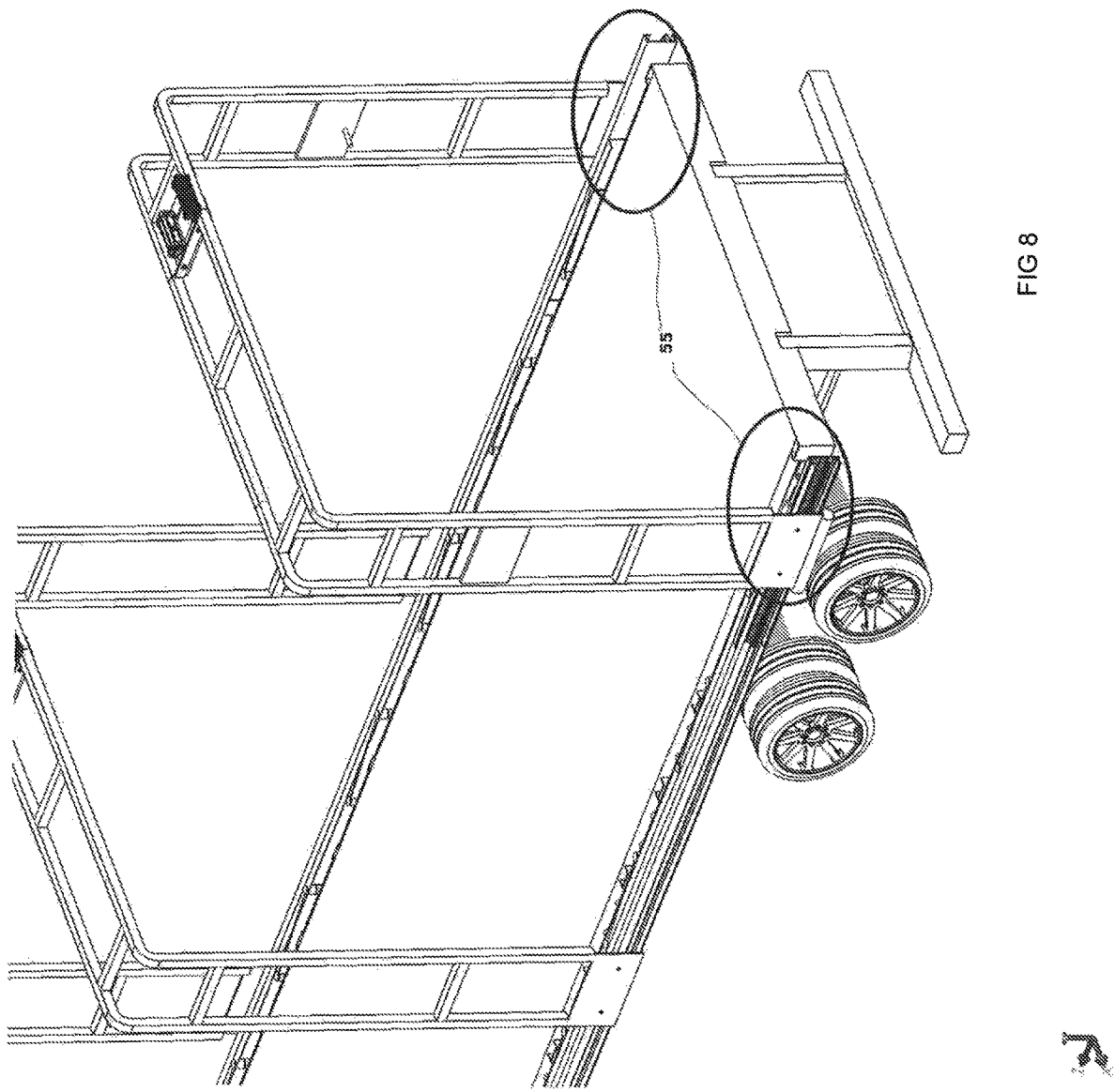
FIG. 8 is a perspective view of the rear of a trailer of another embodiment including a rear tensioning assemblies.
Figure 9:
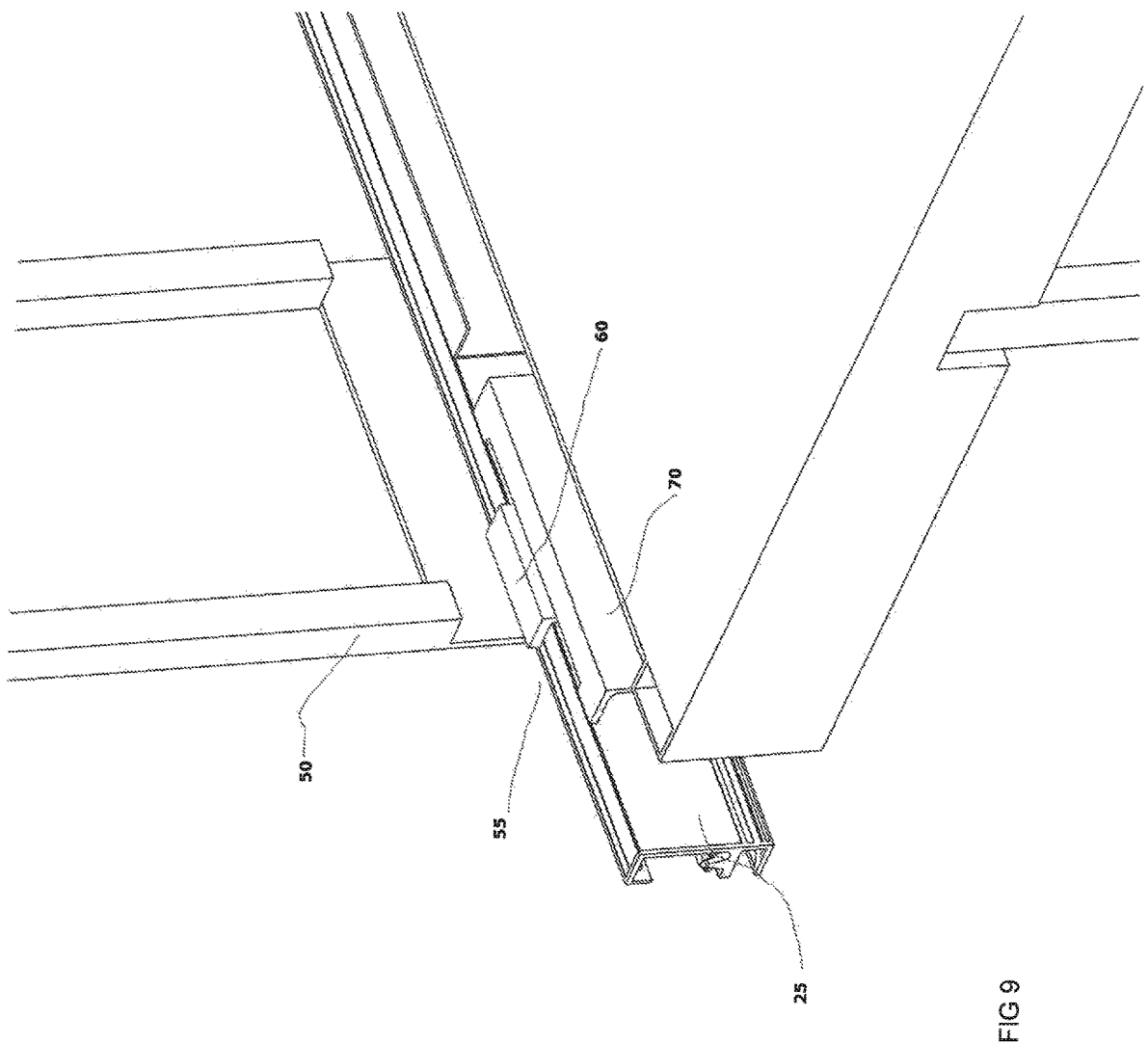
FIG. 9 is a close-up perspective view of the rear of the trailer from FIG. 8 from another angle.

When an extender is engaged, the electric motor 220 turns the shaft 230 which extends the plurality of sliders 240. When the plurality of sliders 240 are extended, the respective attached track 25 moves away from the trailer, creating a wider tarp coverage area. In this embodiment, to enable the sliding tarp system to widen, the plurality of frames 50 comprise at least two pieces configured to expand outward from the trailer when the extenders are engaged. Once the extender is extended the plurality of frames 50 can be moved along the tracks 25 normally. FIG. 7 schematically depicts a close-up of an extender comprising a shaft 230, an electric motor 220, and a plurality of sliders 240. It will be understood that the extender arrangement shown in FIGS. 5 and 6 is schematic only, and is meant to depict a system in which shaft 230, at each slider 240 is provided with means to move the slider laterally. This means may comprise a toothed rack in slider 240 that is driven inwardly or outwardly by shaft 230, and in that case, shaft 230 would be provided with gear teeth at each junction with a slider 240. Other means to drive sliders 240 laterally will be apparent to one skilled in the art. For instance, instead of a motor 220 driving a shaft 230, hydraulic or pneumatic cylinders may be provided to move the track inwardly or outwardly, or this may be done manually. In any case, it is necessary for the inward end of the slider, or hydraulic/pneumatic cylinder to be firmly anchored to the frame of the trailer, and for the outer end thereof to be securely attached to track 25 or a longitudinal frame on which track 25 is mounted.

It will be understood that in embodiments employing an extender arrangement, the frames 50 should be provided with telescopic means 51 to widen (see FIG. 5). Such telescopic means 51 can comprise having upper tubular elements of frames 50 fit together telescopically so that the sides of the frames 50 can be pulled apart for the frame to be wider, or pushed together for the frame to be narrower.

FIGS. 8 to 11 depict another embodiment of a sliding tarp system comprising a pair of rear tensioner assemblies 55.

Each rear tensioner assembly is positioned at the rear end of a track 25. The rear tensioner assemblies 55 can be operated from a control device at a front of a trailer or remotely.

Each rear tensioner assembly 55 comprises a power source 90 and a slide 60 connected at the rear end of each track 25. The power source 90 may be any one of an electric motor and driven shaft, a pneumatic cylinder, a hydraulic cylinder, or any similar power source known in the art. The power source 90 connects to the slide 60 and enables the slide 60 to be moved both towards the front and the rear of the trailer on the respective track 25. The slide 60 is positioned within a channel 70. The channel 70 is secured to the interior side of the respective track 25. The slide 60 is secured to a frame 50 closest to the end of the trailer. When the power source 90 is operated to tension the sliding tarp system the slide 60 is moved towards the rear of the trailer and the tarp is tensioned. When the power source 90 is disengaged, the frame 50 closest to the rear of the trailer is released from tension and can be retracted.

Figure 10:
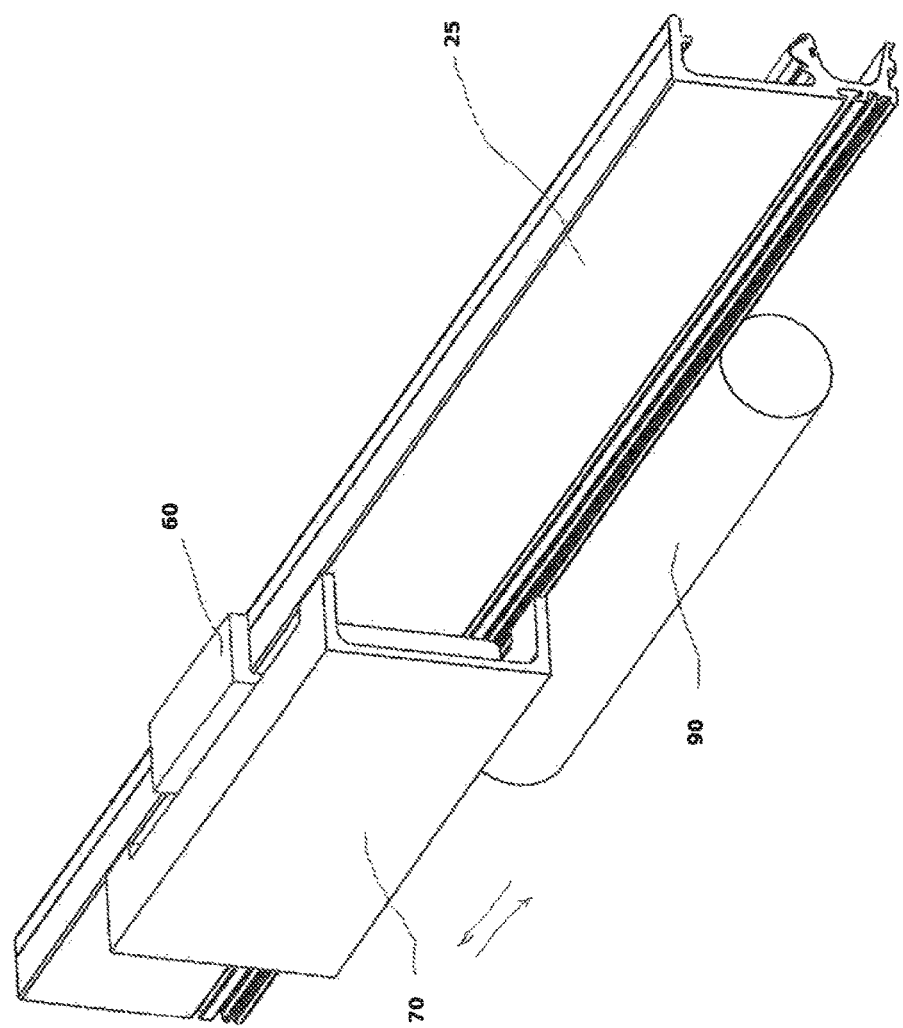
FIG. 10 is a close-up view of the rear tensioner assemblies of FIGS. 8 and 9.

While the assembly of FIG. 10 will function quite well, preferred embodiments of a tensioning mechanism are shown in FIGS. 10A to 10D.

Figure 10A:
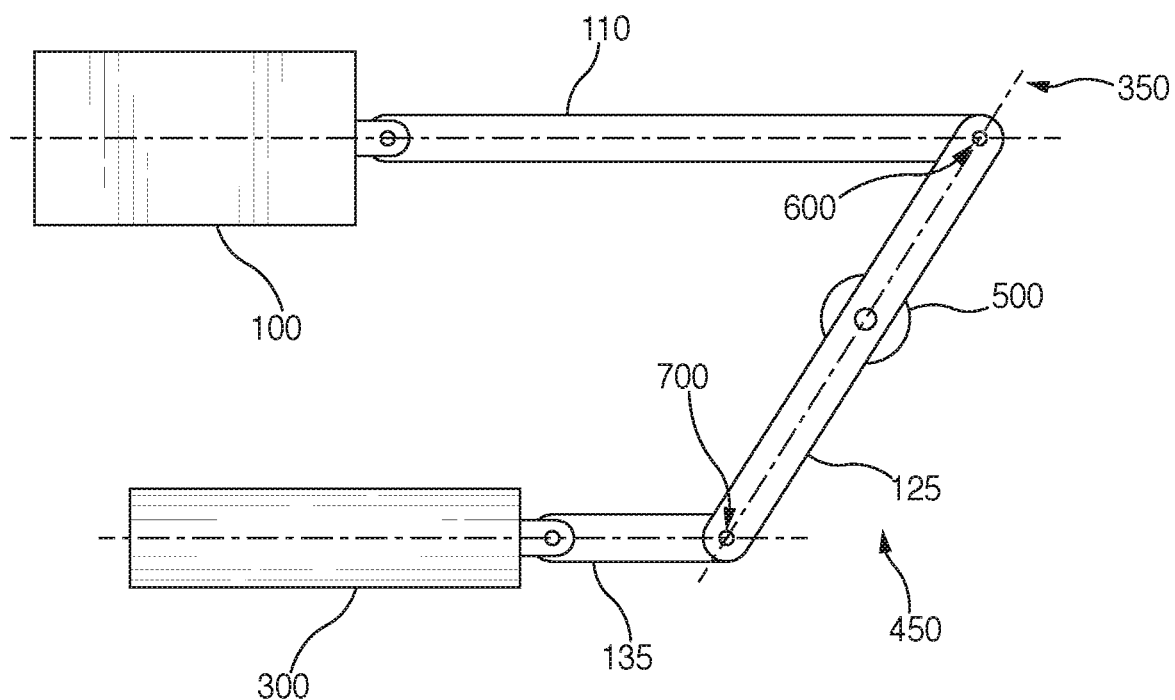
FIG. 10A represents the cantilever option tension mechanism where the retractable tarp system is in open or released position.
Figure 10B:
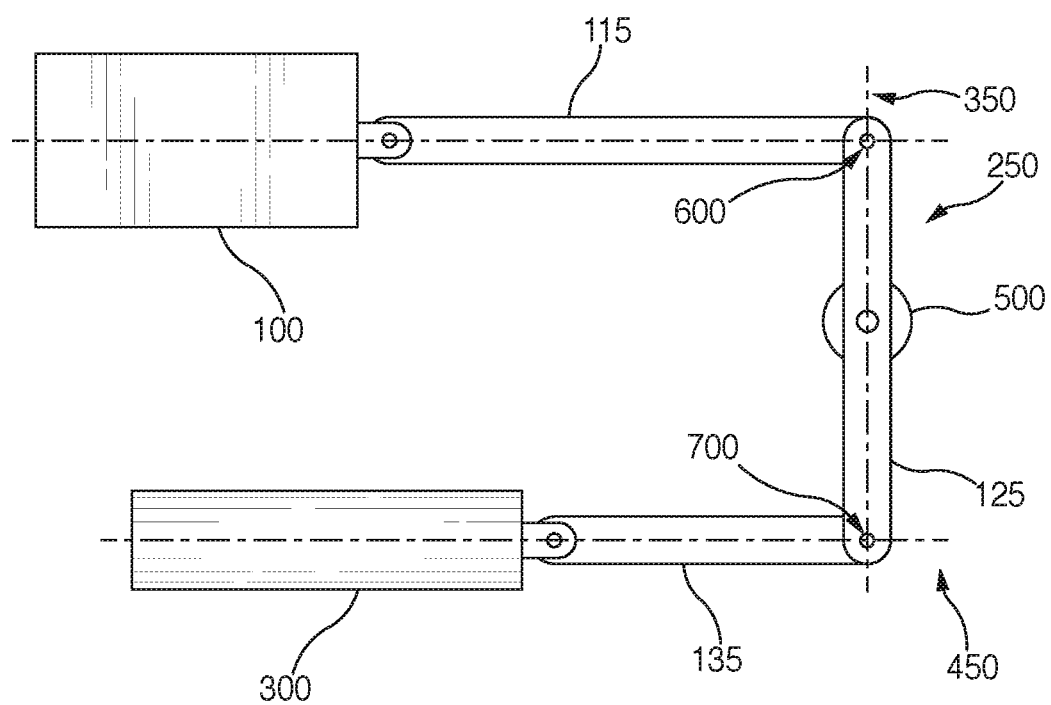
FIG. 10B represents the cantilever option tension mechanism where the retractable tarp system is in tensioned closed position.

FIGS. 10A and 10B show an embodiment of a tensioning device utilizing a power unit 300 that may be mounted to the frame of a trailer. Power unit 300 may, for instance, be a hydraulic cylinder, a pneumatic cylinder, or an electric jack. Unit 300 moves lever link 125 forwardly. It may be connected to lever link 125 by a connecting link 135 or it may be directly connected to lever link 125. As shown in FIG. 10B, as the lever link 125 is urged away from power unit 300, it pivots around point 500, which is also fixed to the trailer frame. The upper end 600 of the lever link 125 may be directly connected to slide 100, that is equivalent to slide 70, to move the rearmost frame, to push it to the end of the trailer, and apply tension to the tarp system. The upper end 600 of lever link 125 may be connected to slider 100 via a further connector link 110, if desired, depending on the physical layout available.

Figure 10C:
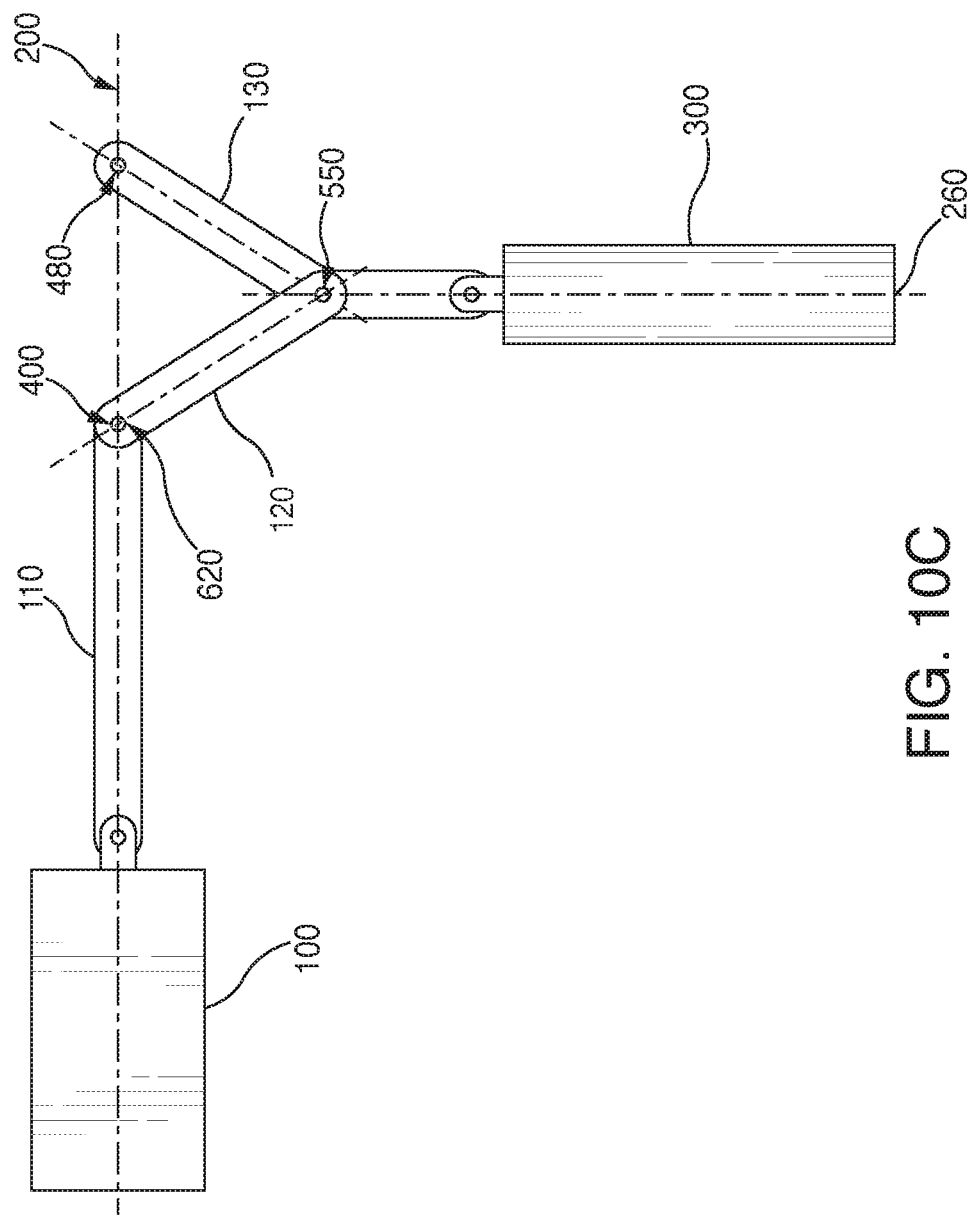
FIG. 10C represents the over centre lock option tension mechanism where the retractable tarp system is in open or released position.
Figure 10D:
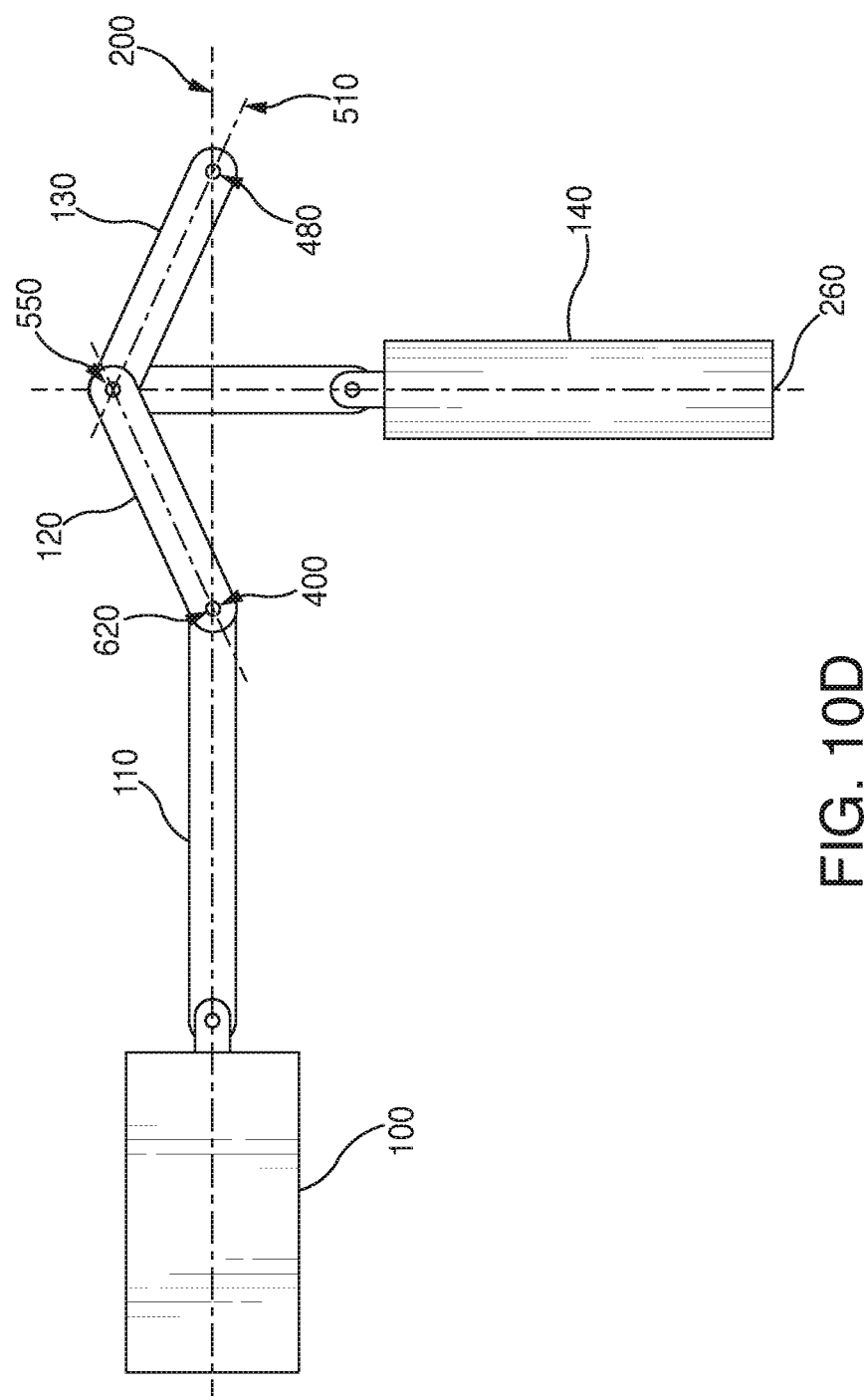
FIG. 10D represents the over centre lock option tension mechanism where the retractable tarp system is in tensioned closed position.
Figure 12:
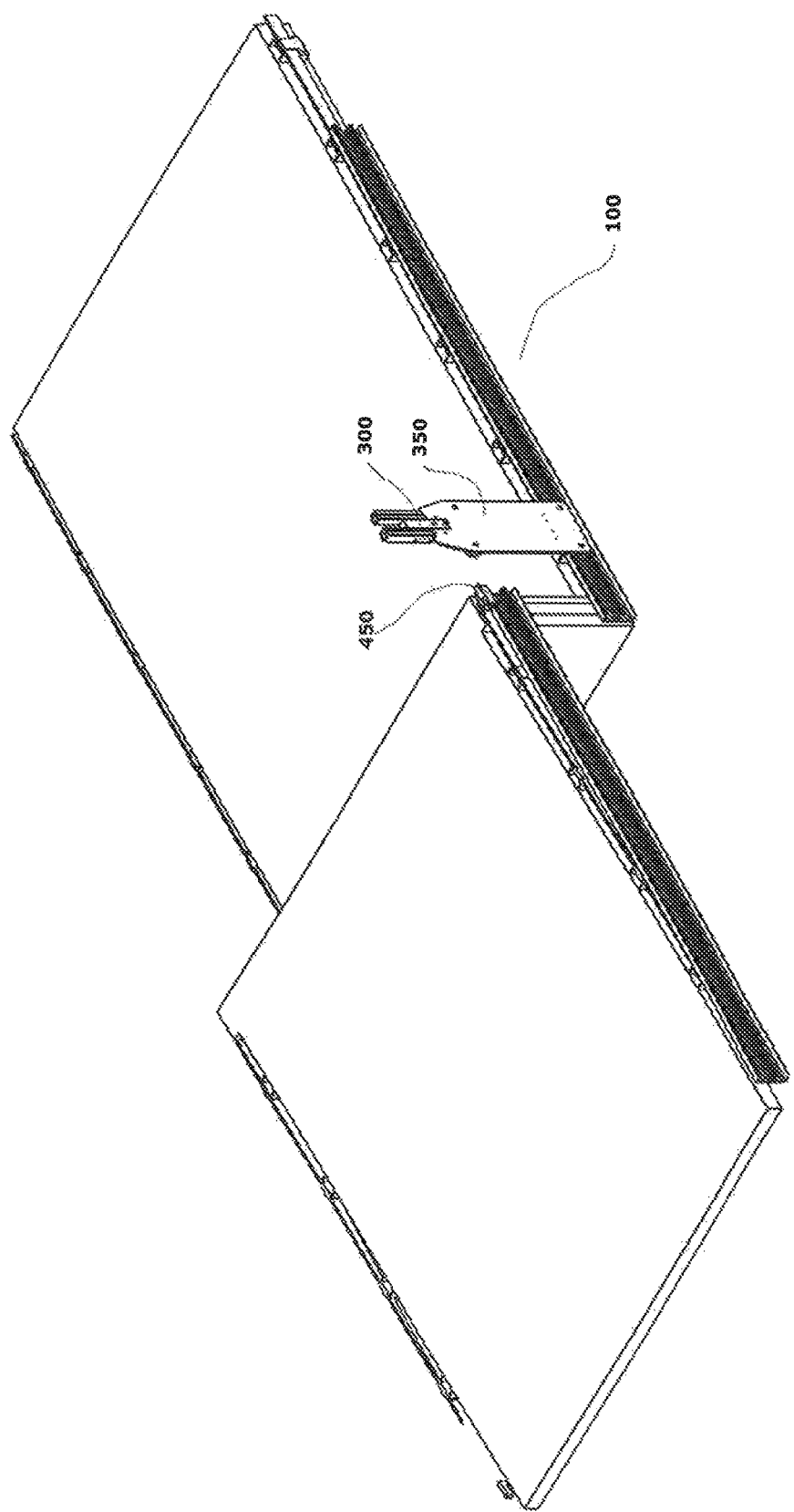
FIG. 12 is a perspective view of an embodiment of a sliding tarp system for a drop deck trailer involving double transitioning carriers.
Figure 13:
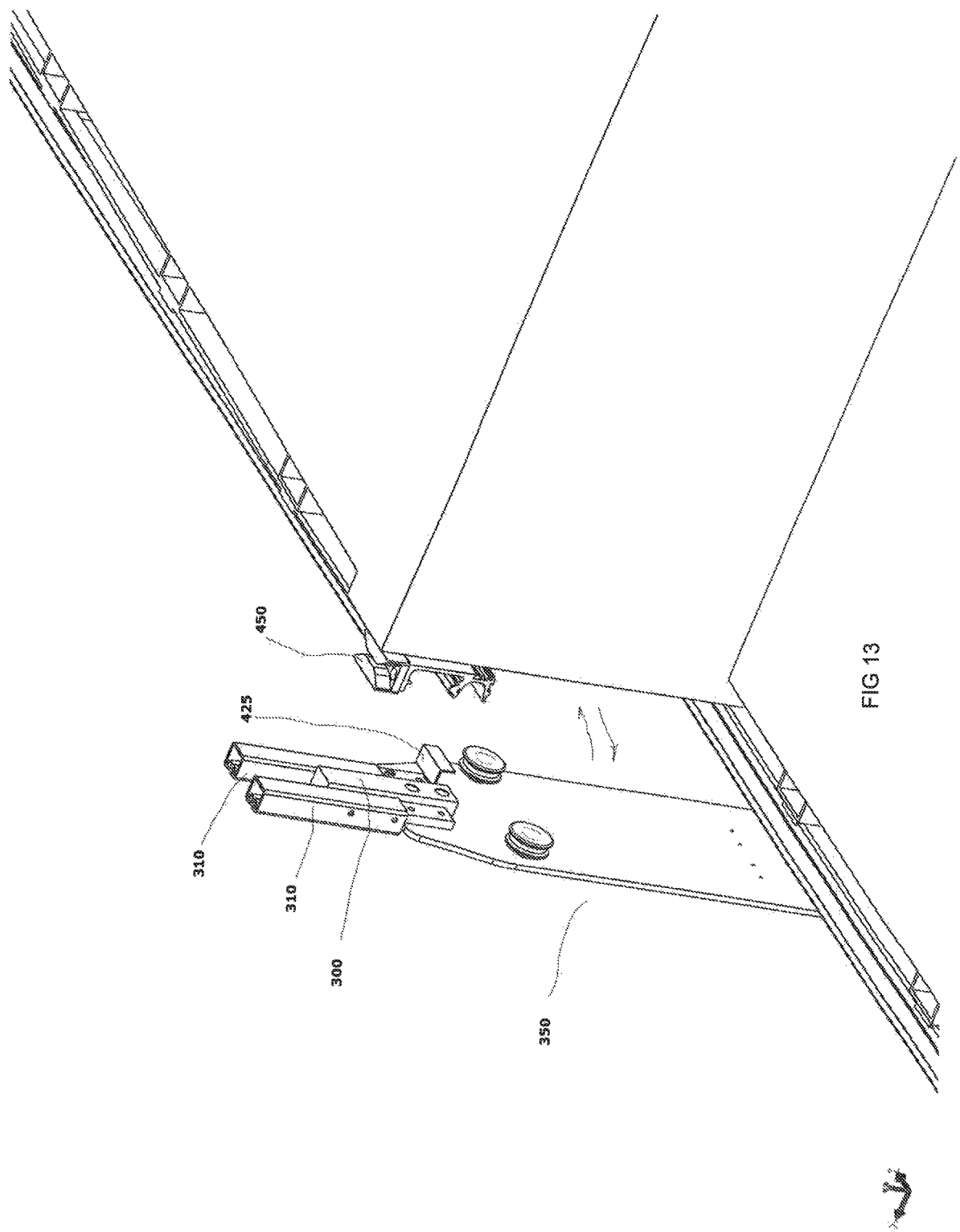
FIG. 13 is a close-up perspective view of the embodiment of FIG. 12 from another angle, depicting in detail the components of the double transitioning frame carrier.
Figure 14:
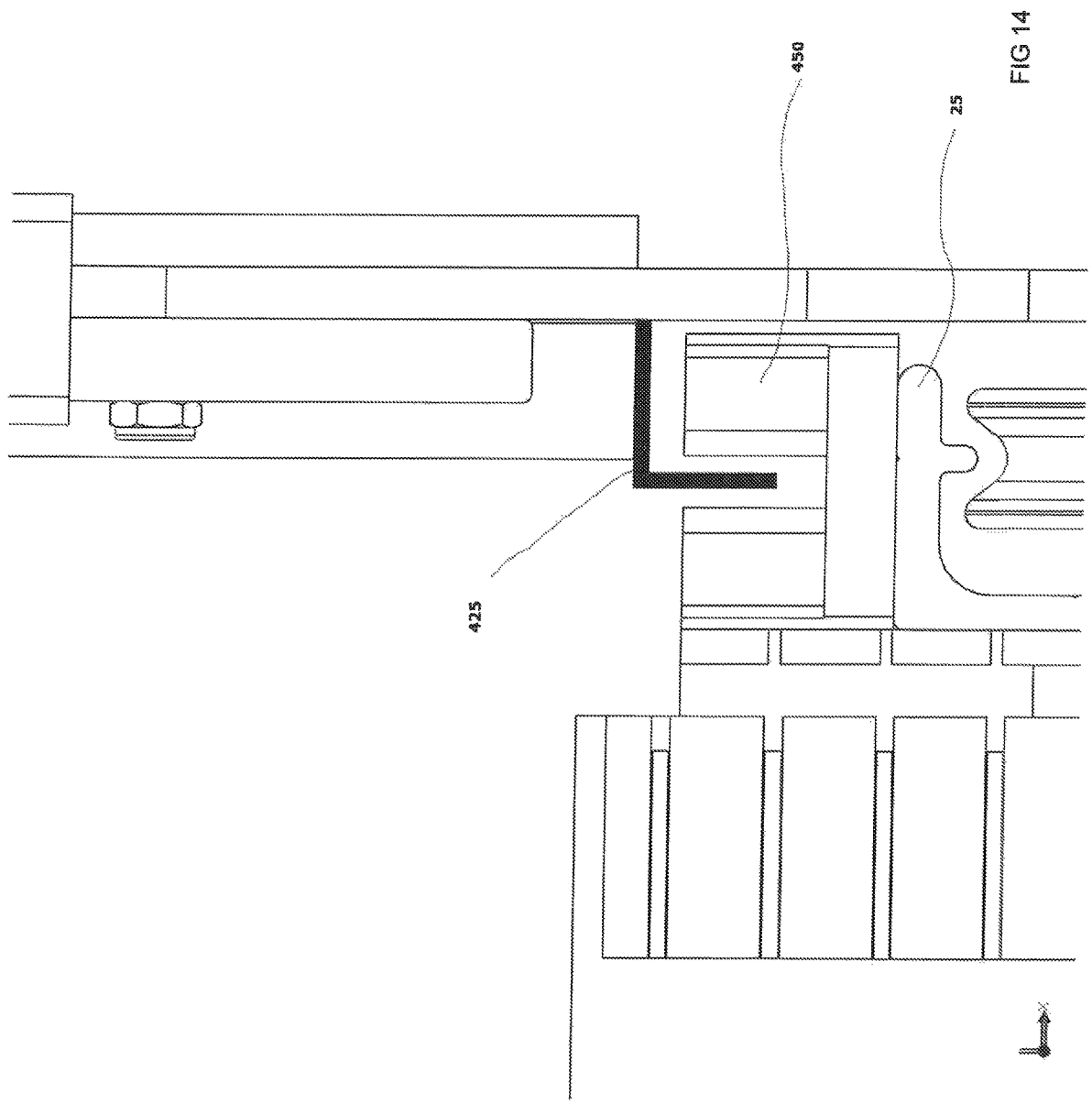
FIG. 14 is a close-up rear view of the double transitioning frame carrier and track of FIGS. 12 and 13.
Figure 15:
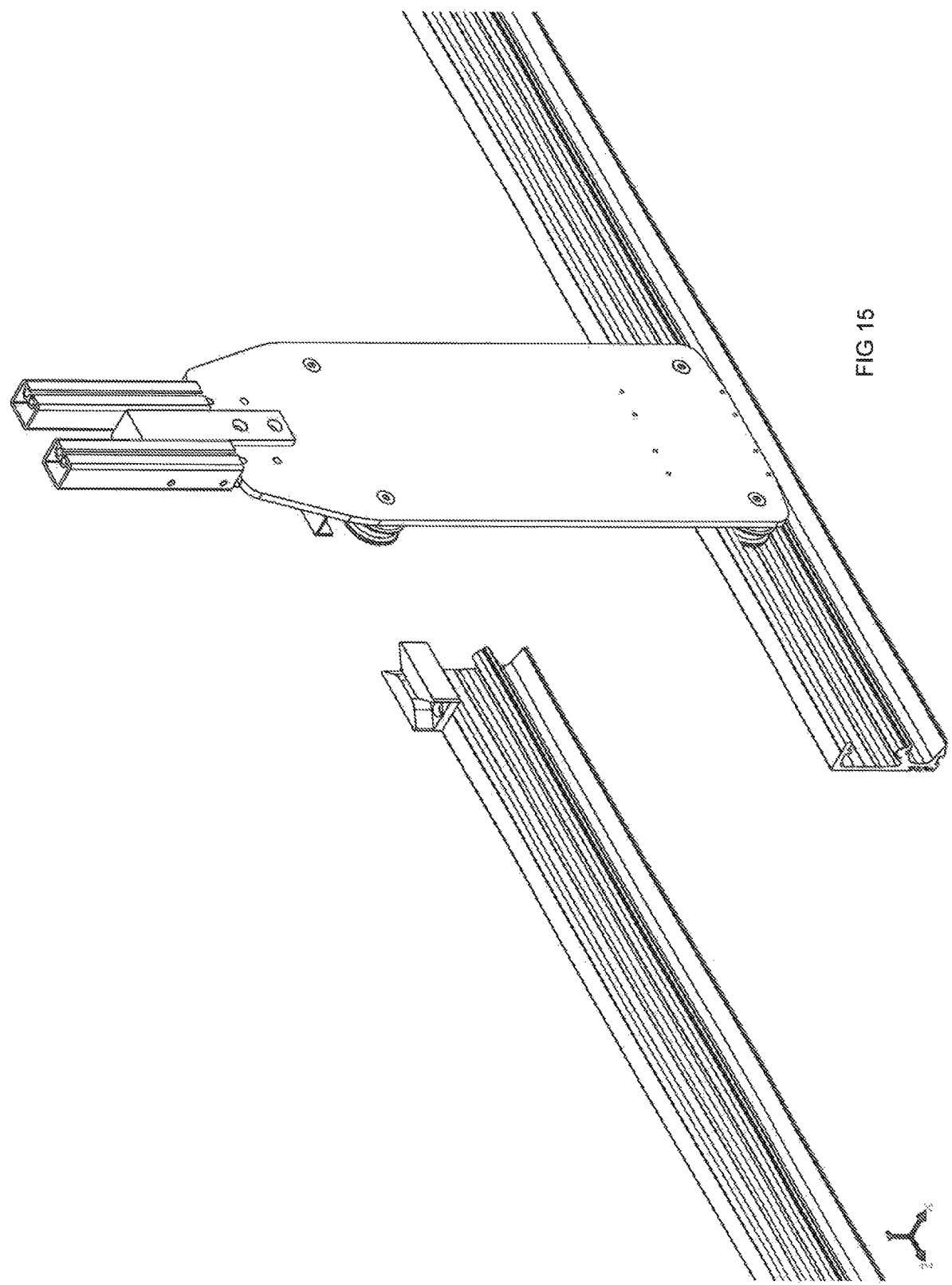
FIG. 15 is a close-up perspective view of only the frame carrier and rails of the double transition sliding tarp system of FIGS. 12 to 14.

FIGS. 10C and 10D illustrate a preferred embodiment, that is self-locking. In this embodiment, power unit 300, preferably a hydraulic cylinder, is connected to a pair of links 120/130, at pivot point 550. The other end of power unit 300, at point 260, is free to pivot.

Link 130 is fixed at pivot point 480 to the trailer frame. Link 120 is connected to slide 100 either directly, or via a link 110, at pivot point 400. If a link 110 is provided, then pivot point 400 should travel in a track, parallel with slide. As power unit 300 is actuated, as shown in FIG. 10D, it pushes links 120 and 130 upwardly, link 120 is urged in the direction of slide 100, pushing it toward the end of the trailer, tensioning the tarp. After pivot point 550 goes past the level of slide 100, it can be powered off, and will thereby lock the slide in place, maintaining tension in the tarp, because as slide 100 pushes against the pressure exerted by link 120, it will tend to push pivot point 550 in an upward direction. This acts as a lock to accidental release of tension in the tarp.

FIGS. 12 to 15 depict another embodiment of a sliding tarp system comprising carriers 350 which are configured to engage a lower track and an upper track of a drop deck trailer. The drop deck carriers 350 comprise an upper pair and a lower pair of wheels aligned to engage the upper track and the lower track respectively. The drop deck carriers 350 also comprise a bracket 425 slightly above the upper pair of wheels. When the drop deck carriers 350 reach the end of the lower track adjacent to the upper track, the bracket 425 engages a bracket receiver 450 positioned at the edge of each upper track. The brackets 425 and bracket receivers 450 guide the carriers onto the upper track smoothly, diminishing the likelihood of the carrier 350 missing the upper track due to environmental conditions.

Figure 16:
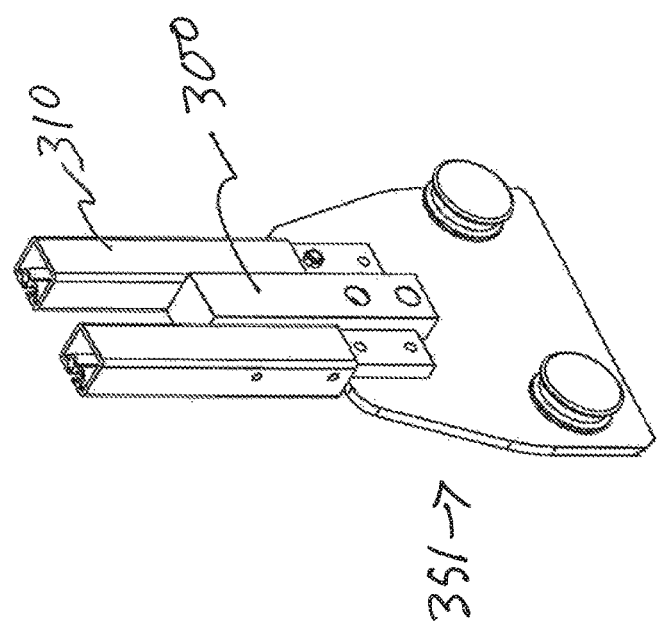
FIG. 16 is a close-up perspective view of an embodiment of a frame carrier not for use with a double transition system with an additional reinforcement element.
Figure 17:
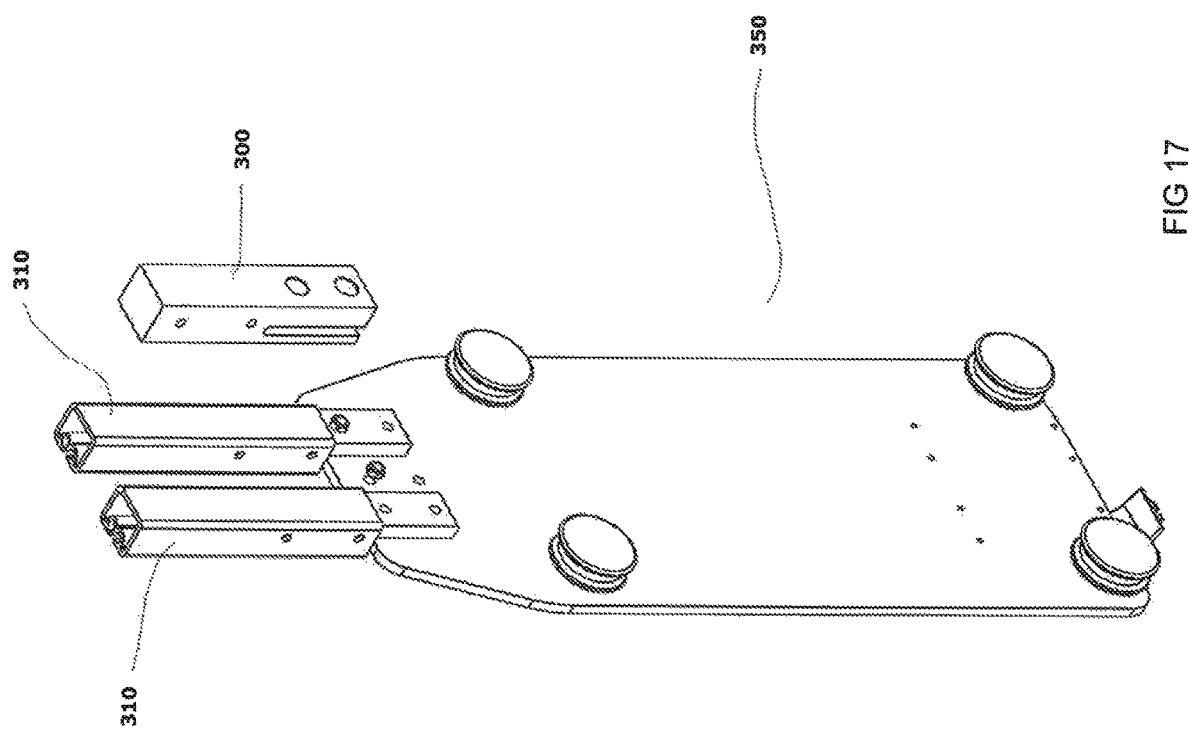
FIG. 17 is the same view as FIG. 16 with the reinforcement element removed from the frame carrier, and showing a carrier for use with a double transition system.

FIGS. 16 and 17 depict another embodiment of the carriers 350 for a sliding tarp system. The carrier 350 of FIG. 17 is also depicted in FIGS. 12 to 15 but it will be understood by those skilled in the art that the embodiment of FIGS. 12 to 15 does not necessarily require all the depicted features for drop deck transition carriers. Therefore, as shown in FIG. 16, the present invention also provides a carrier 351 for use with a trailer that is provided only with upper type tracks 25, i.e. without a drop deck. The carriers 350 shown in FIGS. 16 and 17 comprise a pair of frame connectors 310 and a reinforcing element 300 between the pair of frame connectors 310. The reinforcing element 300 reduces fatigue on the frame connectors 310 and the surrounding area, decreasing the likelihood of cracks or breakage. Frame connectors 310 engage frames 50 securely, for instance by nuts and bolts.

Figure 18:
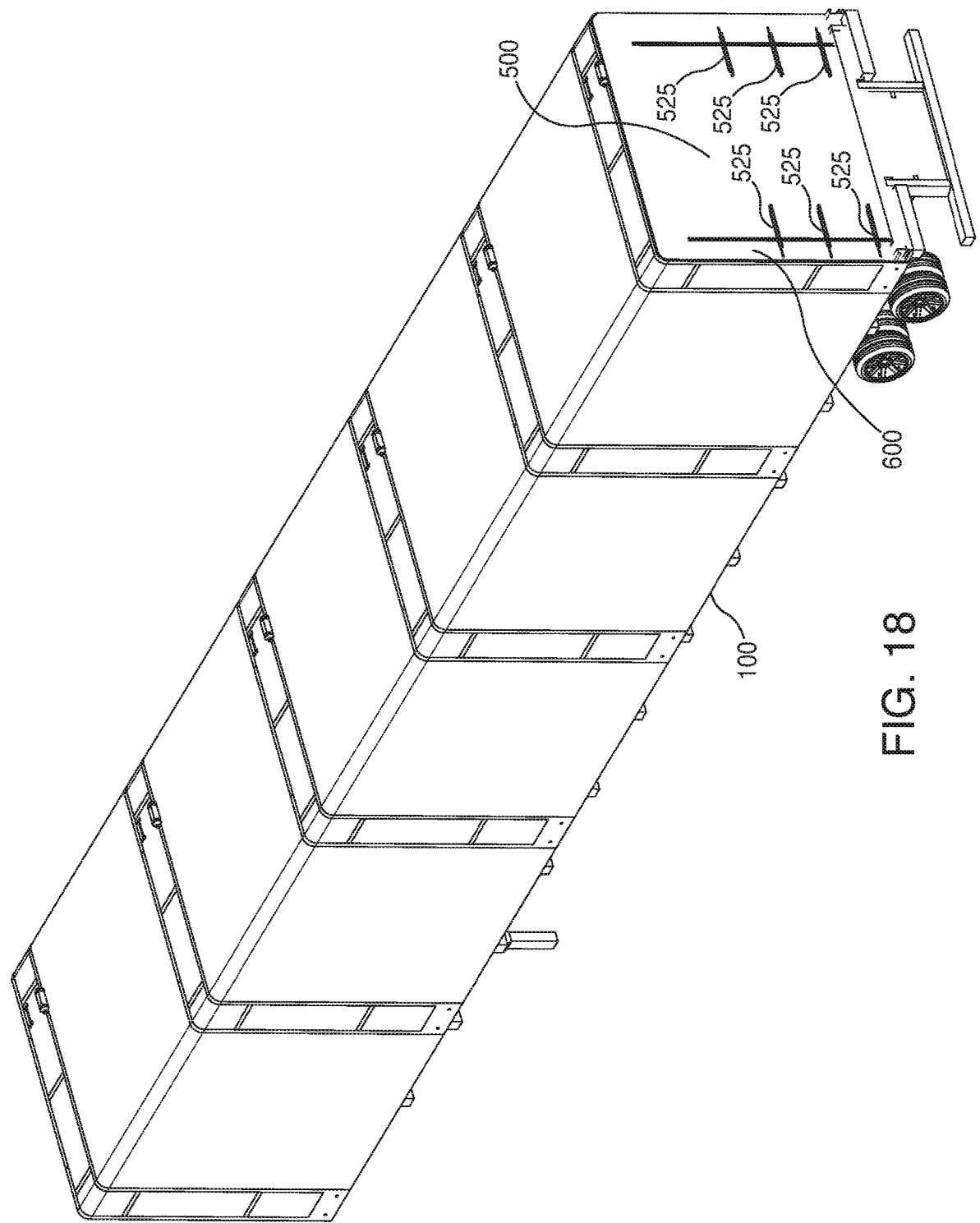
FIG. 18 is a perspective view of another embodiment of a sliding tarp system with a flap securing system.
Figure 19:
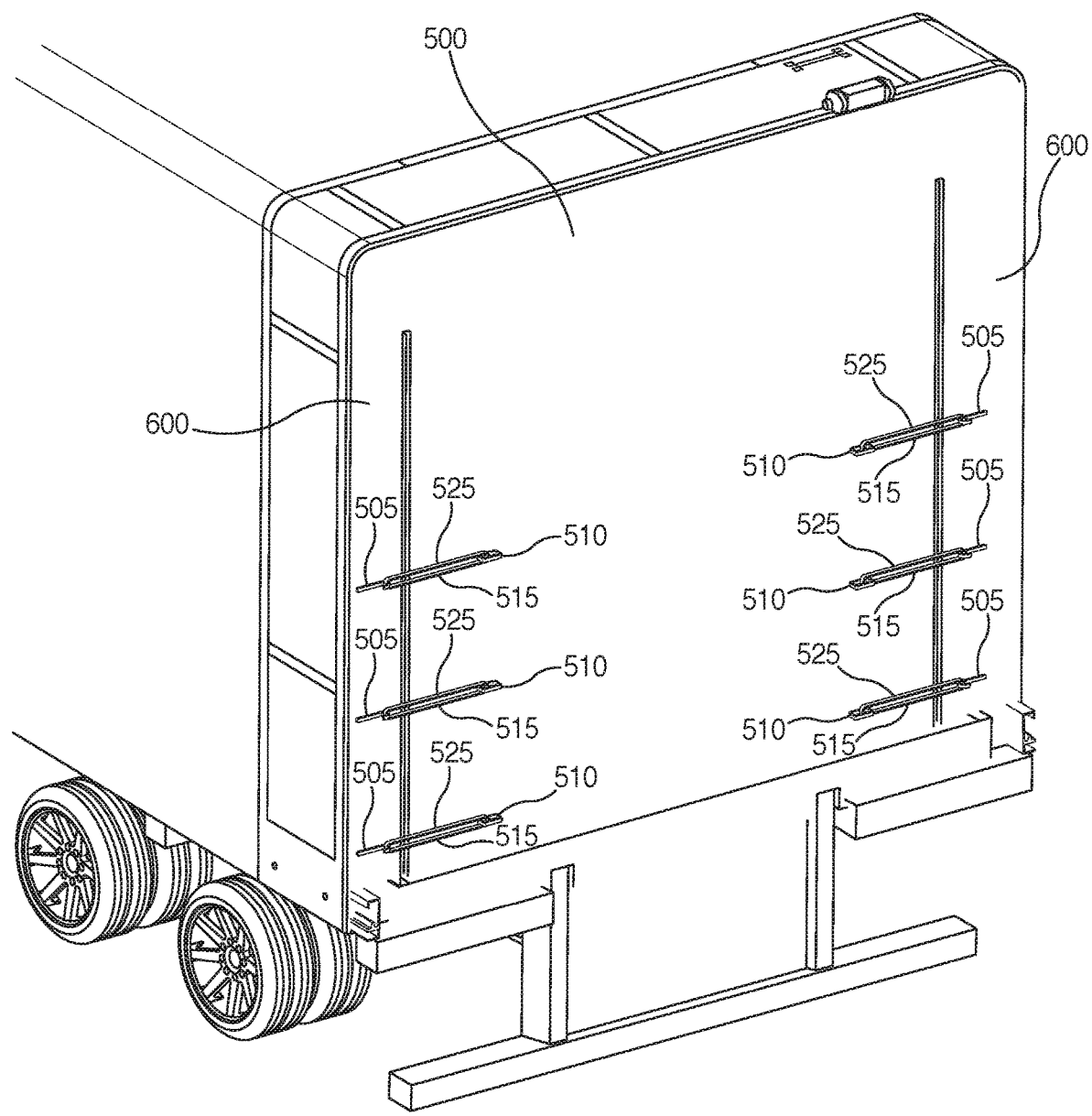
FIG. 19 is a close-up of the view of FIG. 18.

FIGS. 18 to 20 depict another embodiment of a sliding tarp system including a plurality of flap securing assemblies 525 for a rear flap 500. Each of the flap securing assemblies 525 comprises a hook 505, an elastic cord 515, and a loop 510. It will be understood by those skilled in the art that the cord does not have to be elastic in every embodiment and the cord could be any suitable strong cord. However, use of elastic enables a tighter hold than fixed length materials. For each flap securing assembly 525, the loop 510 is secured to the flap 500 and the corresponding hook 505 is secured on an exterior flap wall 600. The elastic cords 515 run through the loops 510, securing them to the loops 510. To secure the flap 600 closed, the elastic cords 515 are pulled over the hooks 505.

It will be understood by those skilled in the art that throughout this specification terms such as front and rear are used merely for clarity in relation to the figures. Furthermore, the above embodiments are merely intended to be examples of the present invention. Alterations and modifications to the above embodiments may be effected without departing from the scope of the invention, which is defined solely by the claims appended hereto.

What is claimed is:

1. A sliding tarp system for a storage area which comprises,
    a first track;
    a second track;
    a first track extension;
    a second track extension;
    a plurality of frames;
    a plurality of carriers;
    a U-shaped headboard; and
    a fixed front wall;
    wherein, the first track is attached lengthwise at a first side of the storage area and the second track is attached parallel to the first track at a second side of the storage area;
    wherein, each of the plurality of frames has a carrier attached at a base of a first side of the frame and a carrier attached at a base of a second side of the frame;
    wherein, the carriers comprise a set of wheels constructed to engage with the first track and the second track such that the carriers are movable along the first track and second track when engaged therewith;
    wherein, when a carrier at a first side of a frame and a carrier at a second side of a frame are engaged with the first track and the second track, the frame provides support for a tarp and the frame can be slid in the tracks to extend or retract the tarp;

wherein, at a first end of the storage area the U-shaped headboard is engaged with the first track and the second track by a carrier attached at a base of a first end of the U-shaped headboard and a carrier attached at a base of a second end of the U-shaped headboard;

wherein, a fixed front wall is secured at the first end of the storage area between the U-shaped headboard and a remaining portion of the storage area;

wherein, the first track extension is securable to the first track at the first end of the storage area and the second track extension is securable to the second track at the first end of the storage area; and wherein, when the first track extension and the second track extension are secured to the first track and the second track respectively, the U-shaped headboard is slidable onto the track extensions and the plurality of frames are slidable over the fixed front wall onto the frame extensions.

2. The sliding tarp system of claim 1, wherein the first track extension and the second track extension are rotatable to a substantially vertical orientation when not in use.

3. The sliding tarp system of claim 1, wherein the first track extension and the second track extension are removable from the first track and the second track respectively when not in use.

4. A tarp widening assembly for a sliding tarp system comprising,
a first extender;
a second extender; and
a plurality of extendable frames;
wherein, each of the first extender and the second extender comprises,
a motor;
a shaft; and
a plurality of sliders;
wherein, for each of the first extender and the second extender, the motor is connected to an end of the shaft and the plurality of sliders are dispersed evenly along the shaft;
wherein, the first extender is positioned at a first lengthwise side of a storage area adjacent to a first track and the second extender is positioned at a second lengthwise side of the storage area adjacent to a second track;
wherein, the first track is secured to the plurality of sliders of the first extender and the second track is secured to the plurality of sliders of the second extender;
wherein, the plurality of extendable frames slidably engage with the first track and the second track;
wherein, when the motor for each of the extenders is operated in a first direction the respective sliders for each extender move outward from the storage area and when the motor for each of the extenders is operated in a second direction the respective sliders for each extender move inward toward the storage area; and
wherein, when the plurality of sliders for the first extender and the plurality of sliders for the second extender move outward from the storage area, the respective attached tracks move outward from the storage area and the plurality of extendable frames expand to accommodate the new track dimensions.

5. A sliding tarp system comprising,
a drop deck carrier, comprising,
a lower set of wheels;
an upper set of wheels; and
a bracket;
a pair of upper tracks, comprising,
a bracket receiver on each track;
a pair of lower tracks; and
a plurality of frames;
wherein, the pair of upper tracks are positioned parallel along a first lengthwise side and a second lengthwise side of an upper area and the pair of lower tracks are positioned parallel along a first lengthwise side and a second lengthwise side of a lower area adjacent to the upper storage area;
wherein, the plurality of frames each have a drop deck carrier attached at a first side and a drop deck carrier attached at a second side such that the lower set of wheels of the drop deck carriers are configured to slidably engage with the pair of lower tracks; and
wherein, when any one of the plurality of frames is slid along the pair of lower tracks to the adjacent edge of the pair of upper tracks, the brackets of the drop deck carriers engage with the bracket receivers of the pair of upper tracks and guide the upper set of wheels of the drop deck carriers into the pair of upper tracks.

* * * * *